US007396023B2

(12) United States Patent
Vlk

(10) Patent No.: US 7,396,023 B2
(45) Date of Patent: Jul. 8, 2008

(54) DRIVING SYSTEM FOR PASSING FLY-OVER OBSTACLES BY INVALID CHAIR

(75) Inventor: Josef Vlk, Rockycany (CZ)

(73) Assignee: Stairbike A.S., Plzen (CZ)

( * ) Notice: Subject to any disclaimer, the term of this patent is extended or adjusted under 35 U.S.C. 154(b) by 0 days.

(21) Appl. No.: 11/574,126

(22) PCT Filed: Aug. 26, 2005

(86) PCT No.: PCT/CZ2005/000064

§ 371 (c)(1),
(2), (4) Date: Feb. 22, 2007

(87) PCT Pub. No.: WO2006/021163

PCT Pub. Date: Mar. 2, 2006

(65) Prior Publication Data

US 2007/0246906 A1 Oct. 25, 2007

(30) Foreign Application Priority Data

Aug. 27, 2004 (CZ) ................................ PV 908-04

(51) Int. Cl.
*B62B 5/02* (2006.01)

(52) U.S. Cl. .................... 280/5.26; 280/249; 280/250.1

(58) Field of Classification Search ......... 280/5.2–5.32, 280/250.1, 304.1, DIG. 10, 249, 250, 259
See application file for complete search history.

(56) References Cited

U.S. PATENT DOCUMENTS

| | | | | |
|---|---|---|---|---|
| 1,551,127 | A * | 8/1925 | Whyel | 280/47.17 |
| 3,196,970 | A * | 7/1965 | Brenner | 180/8.2 |
| 3,214,184 | A * | 10/1965 | Kemm | 280/5.26 |
| 3,241,848 | A * | 3/1966 | Flory | 280/5.26 |
| 3,283,839 | A * | 11/1966 | Brown et al. | 180/8.2 |
| 4,108,449 | A * | 8/1978 | Rhodes | 280/5.28 |
| 4,264,085 | A * | 4/1981 | Volin | 280/304.1 |
| 4,310,167 | A * | 1/1982 | McLaurin | 280/5.28 |
| 4,512,588 | A * | 4/1985 | Cox | 280/5.26 |
| 5,356,172 | A * | 10/1994 | Levy et al. | 280/650 |

* cited by examiner

*Primary Examiner*—Anne Marie Boehler
(74) *Attorney, Agent, or Firm*—Notaro & Michalos P.C.

(57) ABSTRACT

A driving system allows an invalid chair having a seating structure, wheels on both sides of the seating structure and at least one front stabilizing wheel, to pass obstacles. The driving system has arms secured to both sides of the seating structure and on which shafts of the wheels are arranged slidingly within two extreme positions. Cranks are on both sides of the seating structure and rotary cross engagement members are at the rear and on both sides of the seating structure and have arms which are terminated with adhesive end pieces. Each crank is connected to a respective rotary cross engagement member through a geared transmission for transmission of rotary movement of the crank to the rotary cross engagement member, and the geared transmission is provided with a flap for preventing reverse rotating of the crank.

1 Claim, 9 Drawing Sheets

DRIVING SYSTEM FOR PASSING FLY-OVER OBSTACLES BY INVALID CHAIR

FIELD OF THE ART

The present invention concerns to driving system for passing fly-over obstacles by invalid chair formed by seating structure, wheels arranged on both sides of the seating structure, and at least one front stabilizing wheel.

BACKGROUND OF THE INVENTION

Prior art driving systems, which form component of invalid chair and enable person operating the invalid chair to pass fly-over obstacles such as especially steps, have very complex and costly constructions completed with necessary electromotive drive and often even with computer regulating balance of invalid chair when passing the mentioned obstacles. In view of the fact that invalid chairs equipped with these systems for the most part are not reasonably priced for disabled persons, there is a demand at present for invalid chair that would have relatively simple construction that would enable person operating the invalid chair to bridge fly-over obstacles solely by exerting manpower. This demand is satisfied by driving system for passing fly-over obstacles by invalid chair according to the present invention.

SUMMARY OF THE INVENTION

The subject of invention is driving system for passing fly-over obstacles by invalid chair formed by seating structure, wheels arranged on both sides of the seating structure and at least one front stabilizing wheel, substance of which consists in that the driving system is formed by arms which are secured to the seating structure on both of its sides and on which wheel shafts are arranged slidingly within two extreme-end positions, cranks arranged on both sides of the seating structure, and rotary cross engagement members which are arranged in rear part of the seating structure on its both sides and have arms terminated with adhesive end pieces, wherein each of the cranks is connected to respective rotary cross engagement member arranged on the same side of the seating structure through geared transmission for transmission of rotary movement of the crank to the rotary cross engagement member, and the geared transmission is provided with flap for preventing reverse rotation of the crank.

The present invention enables to arrange, in a very simple manner and without any external help, invalid chair into position suited to passing the fly-over obstacles. The invalid chair gets into this position simply by turning the invalid chair so that its back faces the fly-over obstacle, overturning the chair backwards into position where the chair bears on ground not only with its wheels but also with the rotary cross engagement members, and extending the wheels of the invalid chair in forward direction. In this position the invalid chair is capable of passing the fly-over obstacle, which is achieved by mere rotating in respective direction the cranks connected via geared transmissions to the rotary cross engagement members. Using the driving system according to the present invention the invalid chair can move over almost all fly-over obstacles which meet respective route standards including standard stairways of a common descent.

DESCRIPTION OF DRAWINGS

The attached

EXAMPLE OF EMBODIMENT OF THE INVENTION

Figure 1:
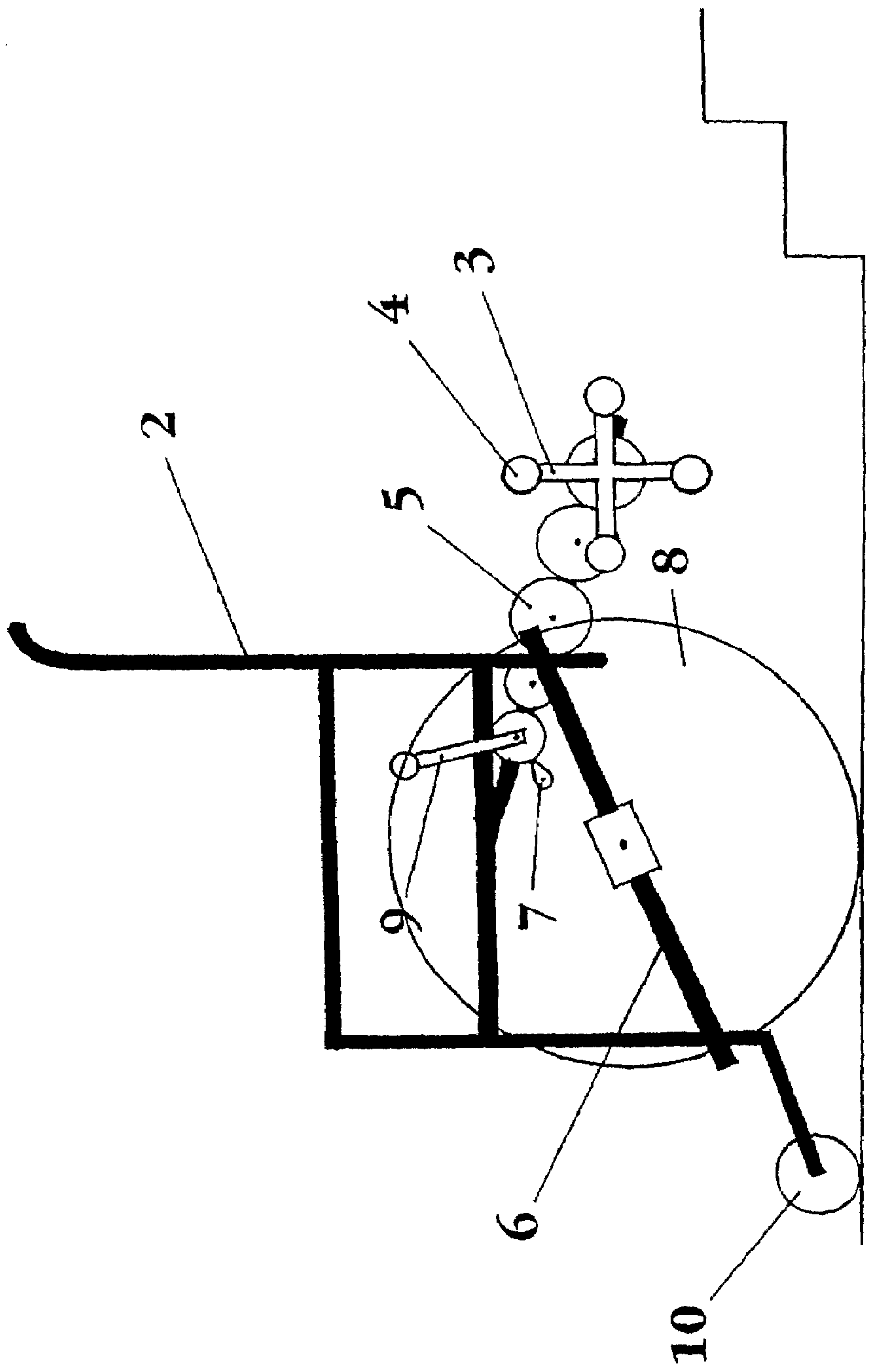
FIGS. 1 to 9 illustrate schematically individual phases of passing a rising fly-over obstacle formed by stairways by preferred embodiment of invalid chair provided with driving system for passing fly-over obstacles according to the invention.

FIG. 1 illustrates schematically example of embodiment of invalid chair in a common position in which the invalid chair is capable of moving only on ground which is free of obstacles. The chair comprises seating structure 2, in which front part two front stabilizing wheels 10 are arranged in rotating manner. Arm 6 is secured to each side of the seating structure 2 and provided with respective chair wheel 8 slidingly attached to the arm 6. Wheels 8 in FIG. 1 are in their rear extreme (end) position. In rear part of the invalid chair on its both sides rotary cross engagement members 3 are arranged on arms secured to the seating structure 2. Arms of the rotary cross engagement members 3 are terminated with adhesive end pieces 4 and connected to respective cranks 9 via geared transmissions 5 which are provided with flaps 7 for preventing reverse rotating of cranks 9.

Figure 2:
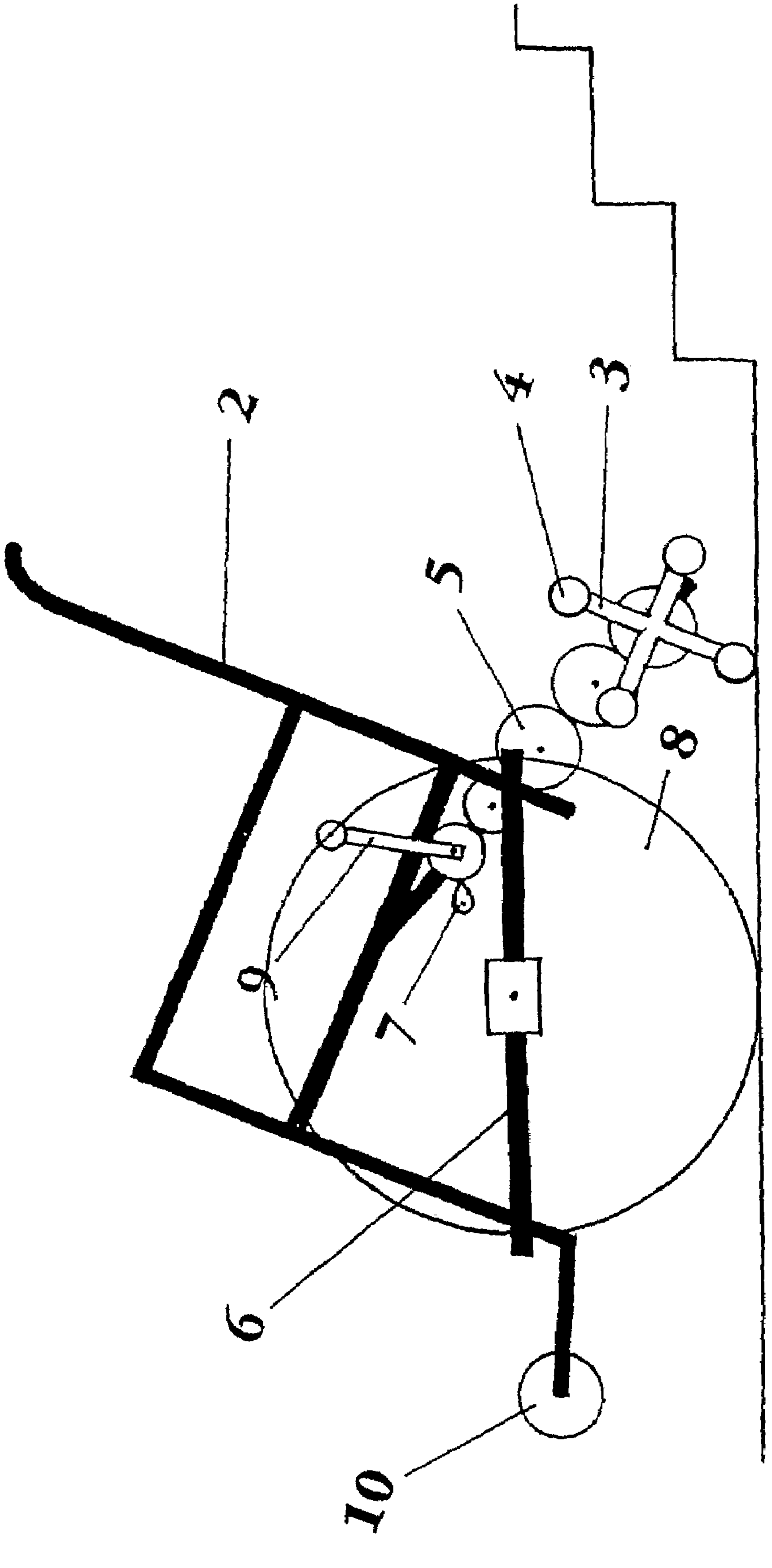

After the invalid chair reaches the stairways person operating the invalid chair turns the invalid chair so that its back faces the stairways and, moving its gravity centre to rear part of the invalid chair, overturns the chair backwards, resulting in the rotary cross engagement members 3 get into contact with the ground and in this position invalid chair bears on the ground with both the wheels 8 and the rotary cross engagement members 3. In this position of invalid chair the front stabilizing wheels 10 are raised out of contact with the ground. This position of invalid chair is illustrated in FIG. 2.

In the second phase of preparing the invalid chair for passing the stairways person operating the chair extends the wheels 8 into the front extreme position by which it is achieved that substantial part of weight of invalid chair and operating person rests on rotary cross engagement members which thus have good engagement with the ground which is in turn a necessary requirement for the members to serve as a driving unit of the invalid chair. This position of the chair is depicted in FIG. 3.

Figure 4:
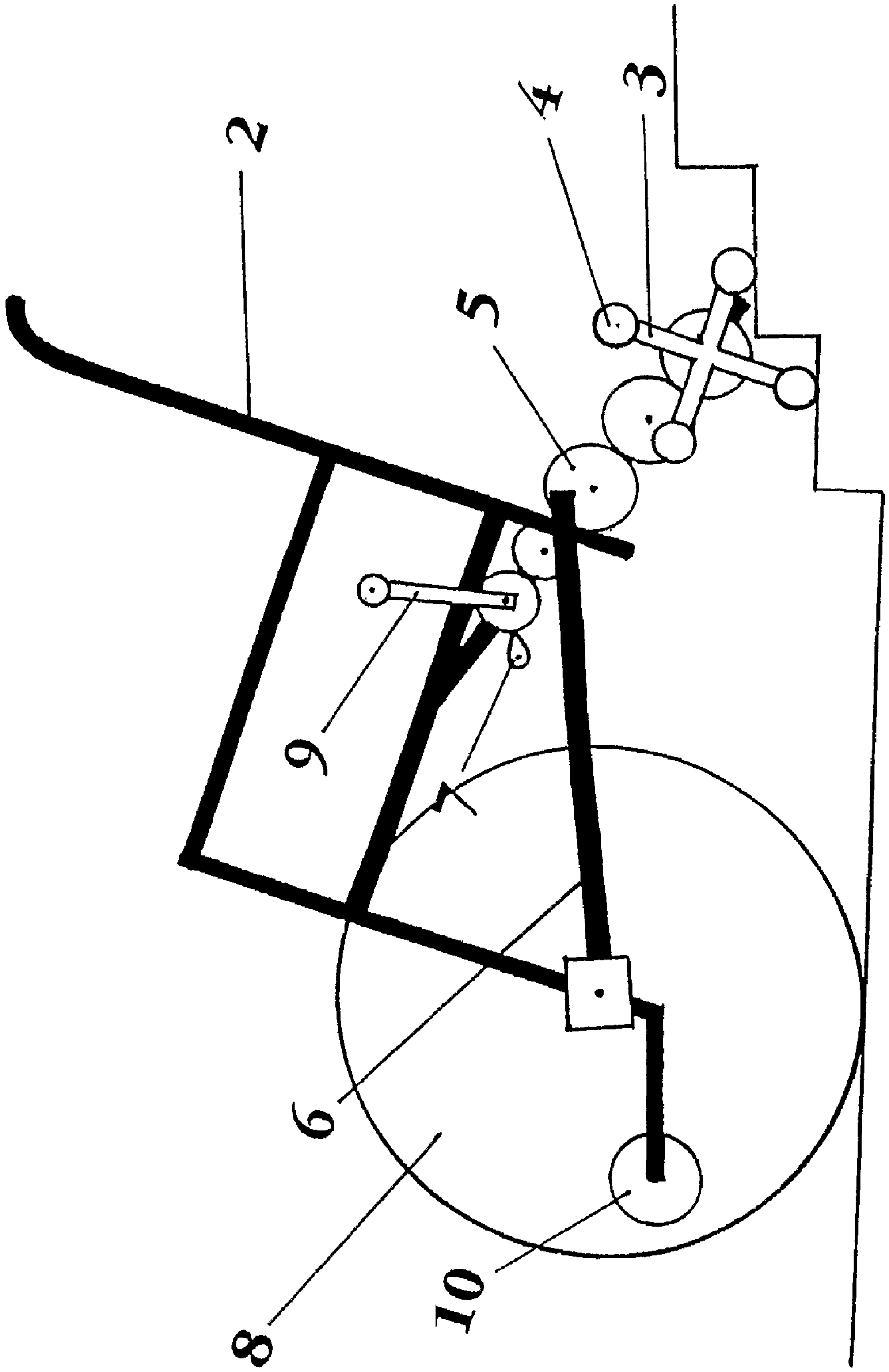
Figure 5:
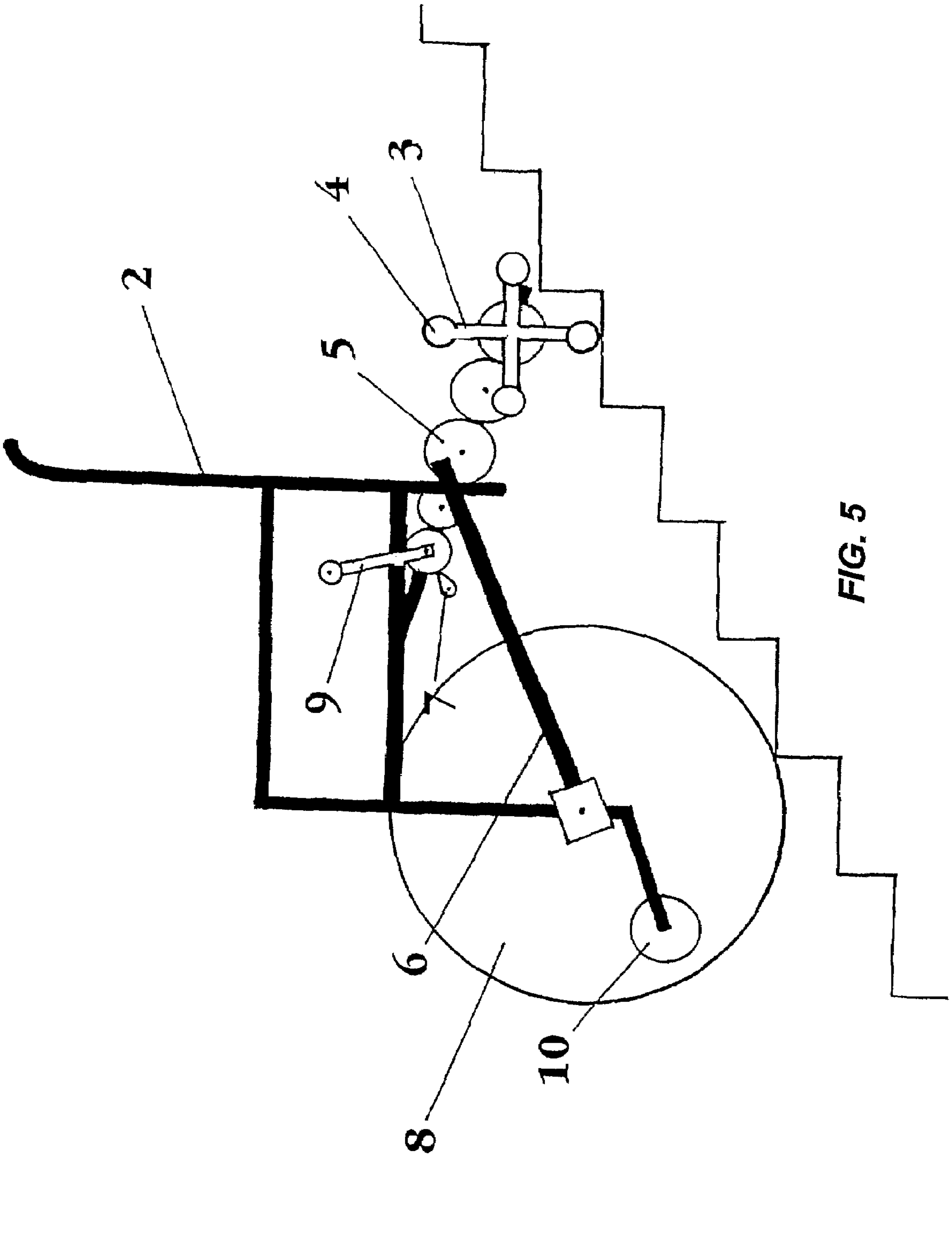
Figure 6:
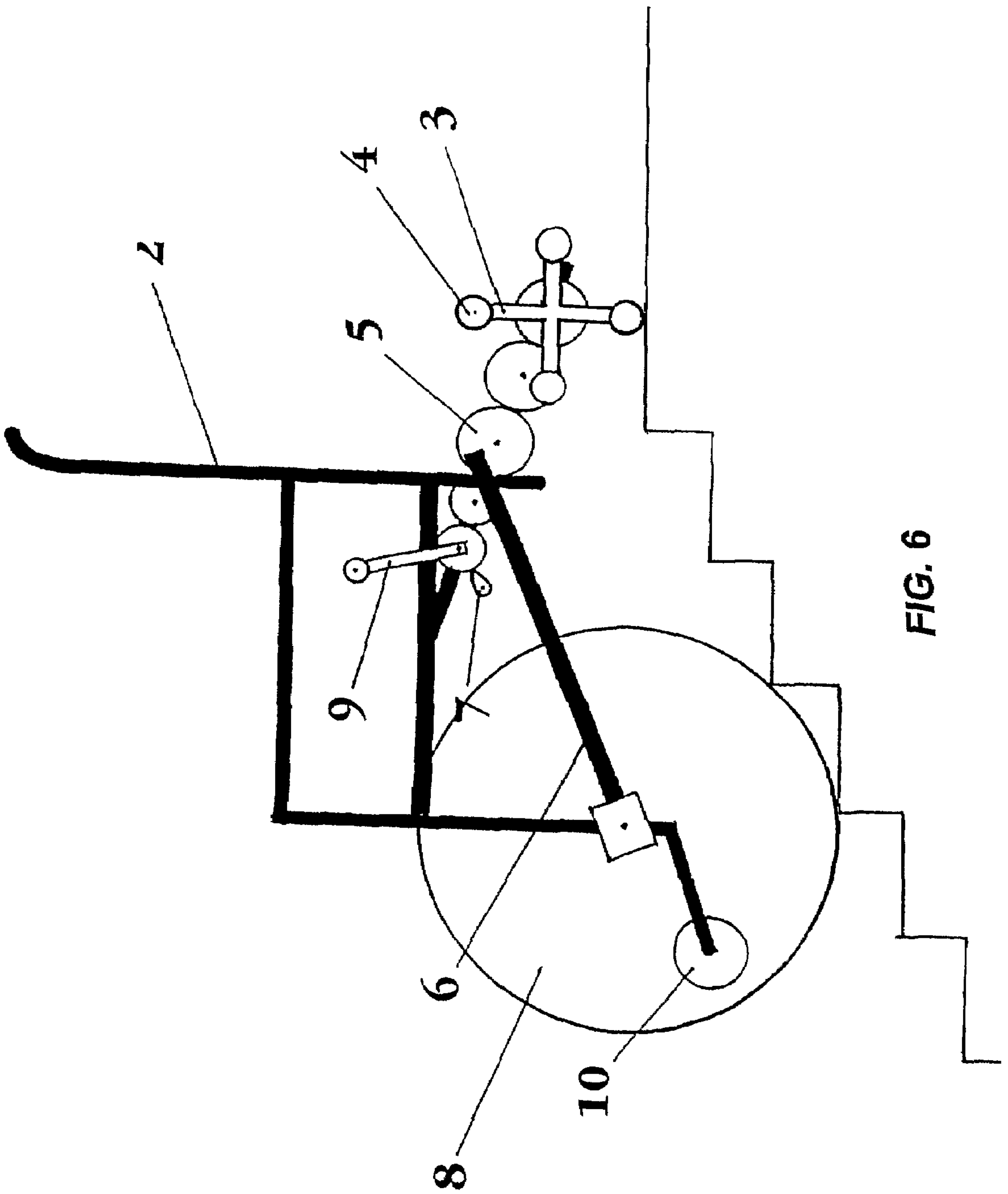

Person operating the invalid chair now rotates the cranks 9 in corresponding direction and invalid chair moves towards the stairways, mounts the stairways until it gets past the stairways (these individual phases of passing the stairways by the invalid chair are illustrated in FIGS. 4 to 6). Undesirable reverse rotation of cranks 9 is prevented by flaps 7.

Figure 3:
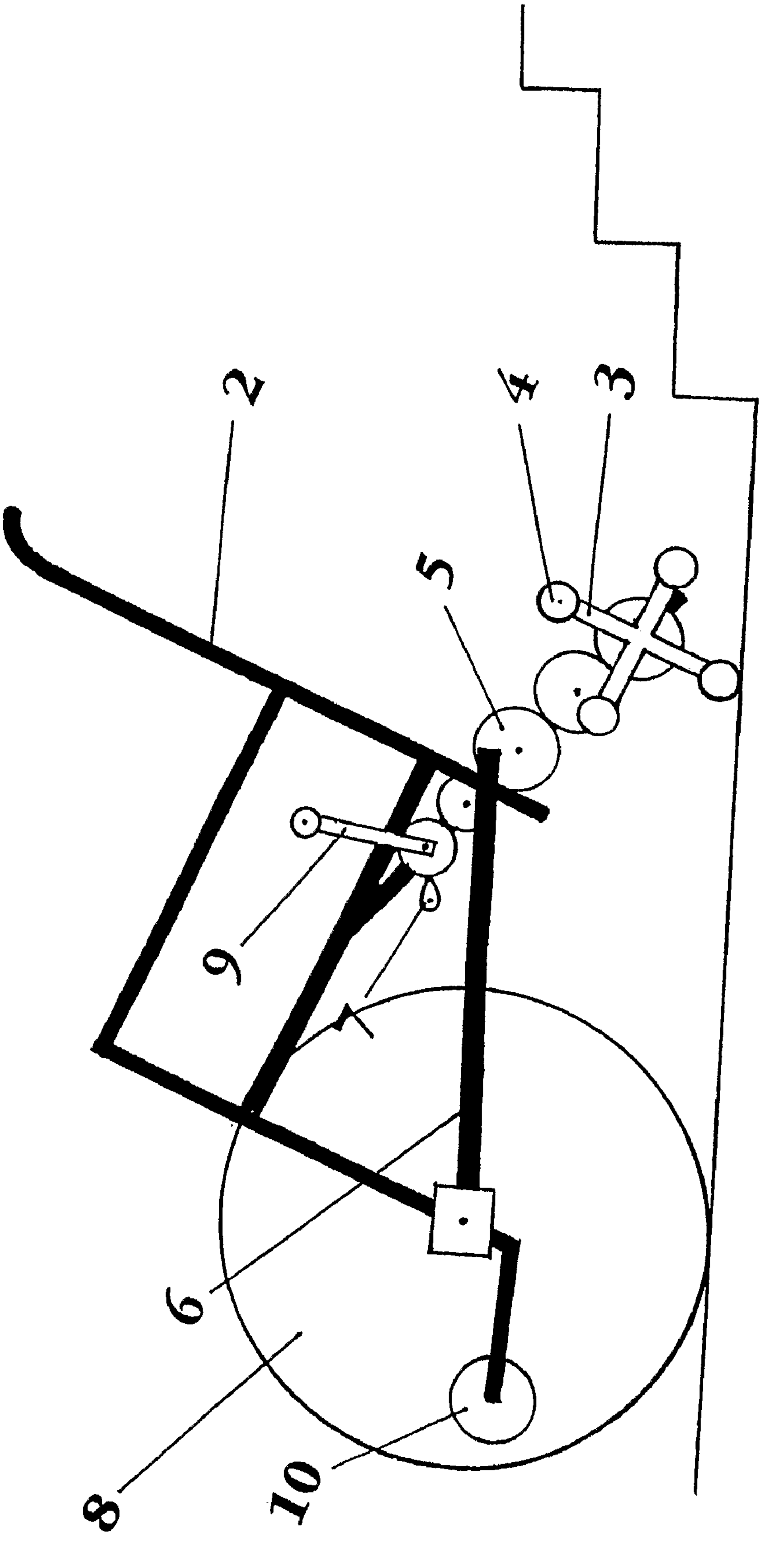
Figure 7:
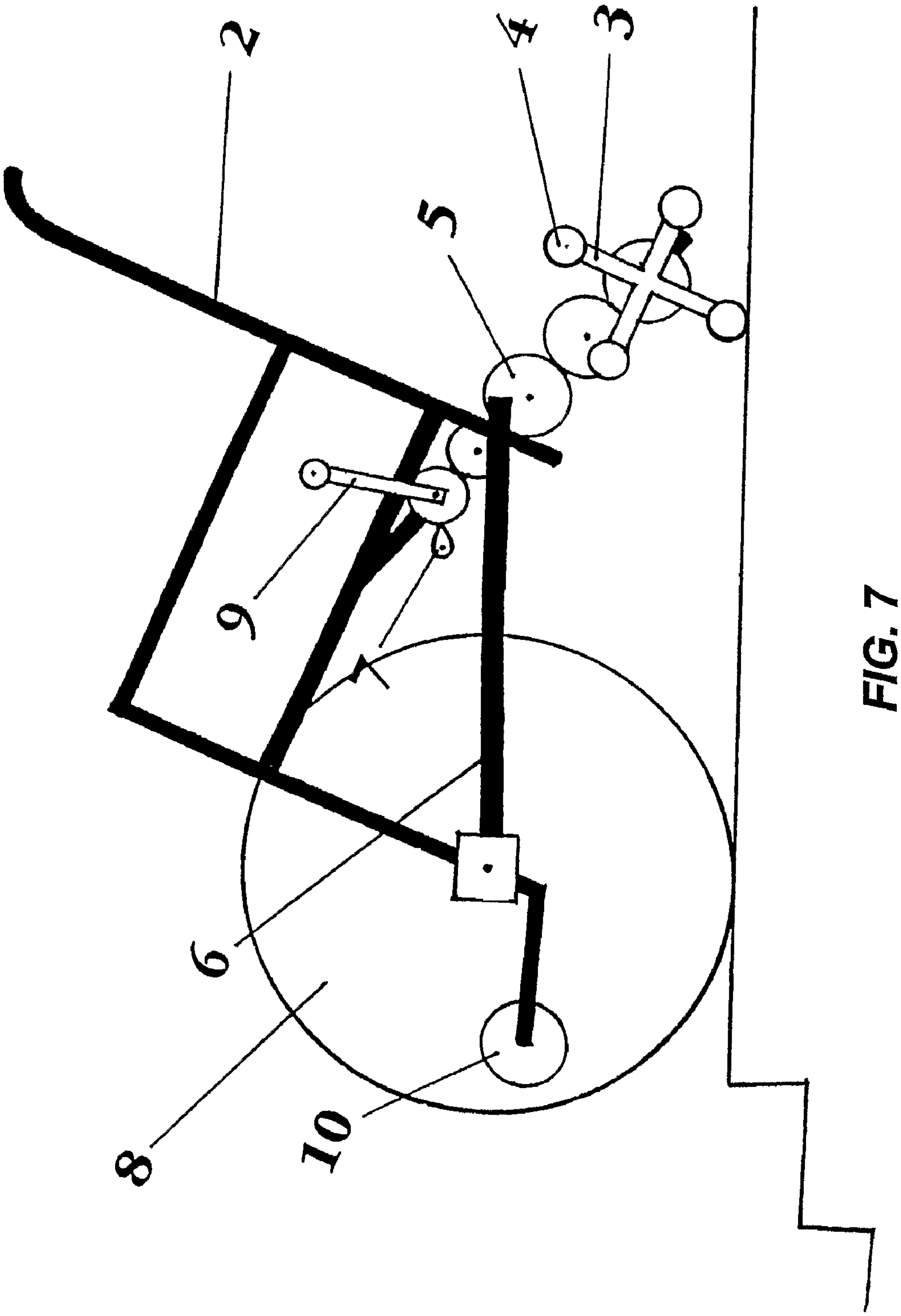
Figure 8:
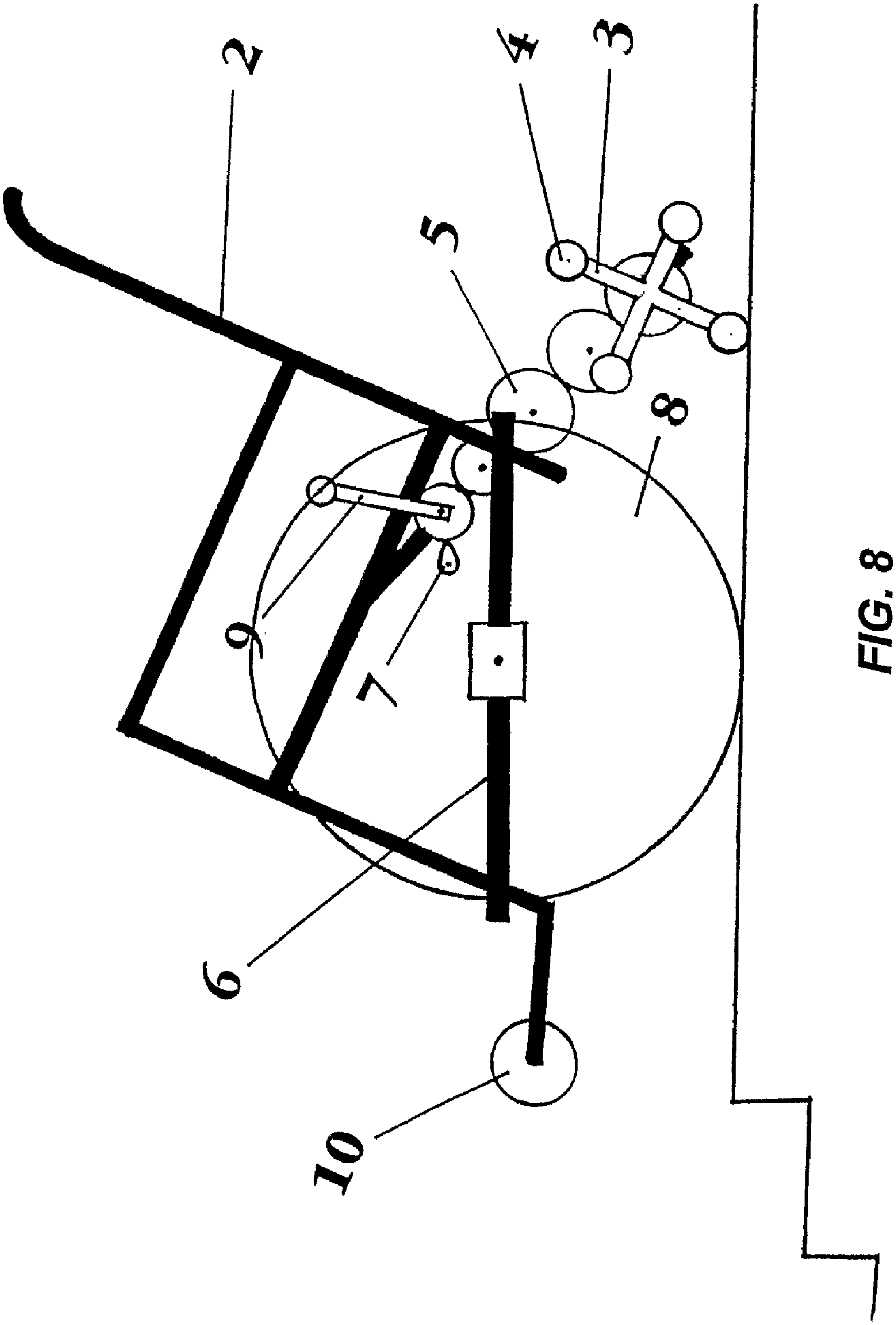
Figure 9:
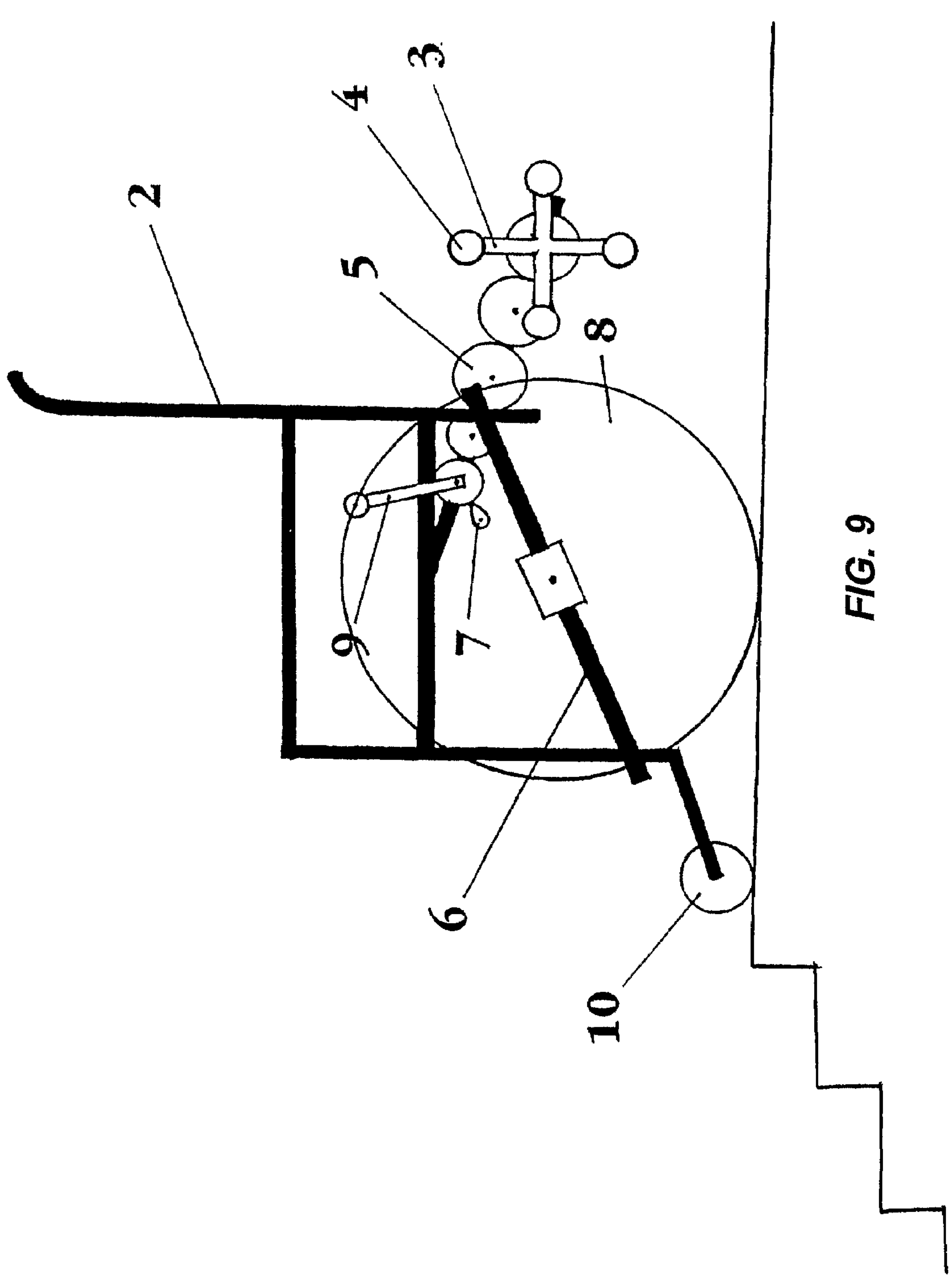

After passing the stairways the invalid chair is in position past the stairways which is depicted in FIG. 7 and which is identical to position in front of the stairways being illustrated in FIG. 3. Now person operating the invalid chair moves the wheels in rear end position, the invalid chair thus being in the position illustrated in FIG. 8, and moving his or her gravity centre towards front part of invalid chair he or she overturns invalid chair again into position depicted in FIG. 9 in which both the wheels 8 and the front stabilizing wheels 10 are in contact with ground and rotary cross engagement members 3 are out of contact with the ground.

When passing declining fly-over obstacle such as when descending stairways downwards it is to proceed in a similar way except for invalid chair is positioned towards the obstacle so that its front part faces the obstacle.

Within the scope of the present invention common arresting means in front and rear position are to be used. As far as the geared transmission 5 is concerned, any suitable geared transmission such as a gearing or a chain transmission or similar transmission may be used within the scope of the invention that ensures a non-skid transmission of rotation of cranks 9 to rotation of rotary cross engagement members 3. In this respect for example transmission through a vee belt is suitable. Of course it is advantageous to use a reduction gear which enables easy rotation of cranks when passing fly-over obstacles by invalid chair. In order to increase comfort for the person operating invalid chair the sliding of the wheels 8 between the both extreme (end) positions and the rotation of the rotary cross engagement members 3 can be provided with a drive, especially electric drive. Further, it is advantageous to provide invalid chair with common break means to secure safety of a person operating the invalid chair during passing fly-over obstacles and also with extensible and hinged bumpers which comes into contact with the ground when overturning the invalid chair backwards before the rotary cross engagement members 3 get into contact with the ground.

The invention claimed is:

1. Driving system for passing over obstacles by an invalid chair formed by a seating structure (2), wheels (8) arranged on both sides of the seating structure (2) and at least one front stabilizing wheel (10), characterized in that the invalid chair is formed by arms (6) which are securable to the seating structure (2) on both of seating structure sides and on which shafts of wheels (8) are arranged slidingly between two end positions, cranks (9) arranged on both sides of the seating structure (2), and rotary cross engagement members (3) which are arranged in rear part of the seating structure (2) on both sides of the seating structure and have arms which are terminated with adhesive end pieces (4), wherein each of the cranks (9) is connected to respective a rotary cross engagement member (3) arranged on the same side of the seating structure (2) through a geared transmission (5) for transmission of rotary movement of the crank (9) to the rotary cross engagement member (3), and the geared transmission (5) is provided with a flap (7) for preventing reverse rotating of the crank (9).

* * * * *